April 23, 1940. J. KAHN 2,197,763
MIXING APPARATUS FOR CHARGING BEVERAGES OR FOR FROTHING LIQUIDS
Filed Sept. 24, 1936 2 Sheets-Sheet 2

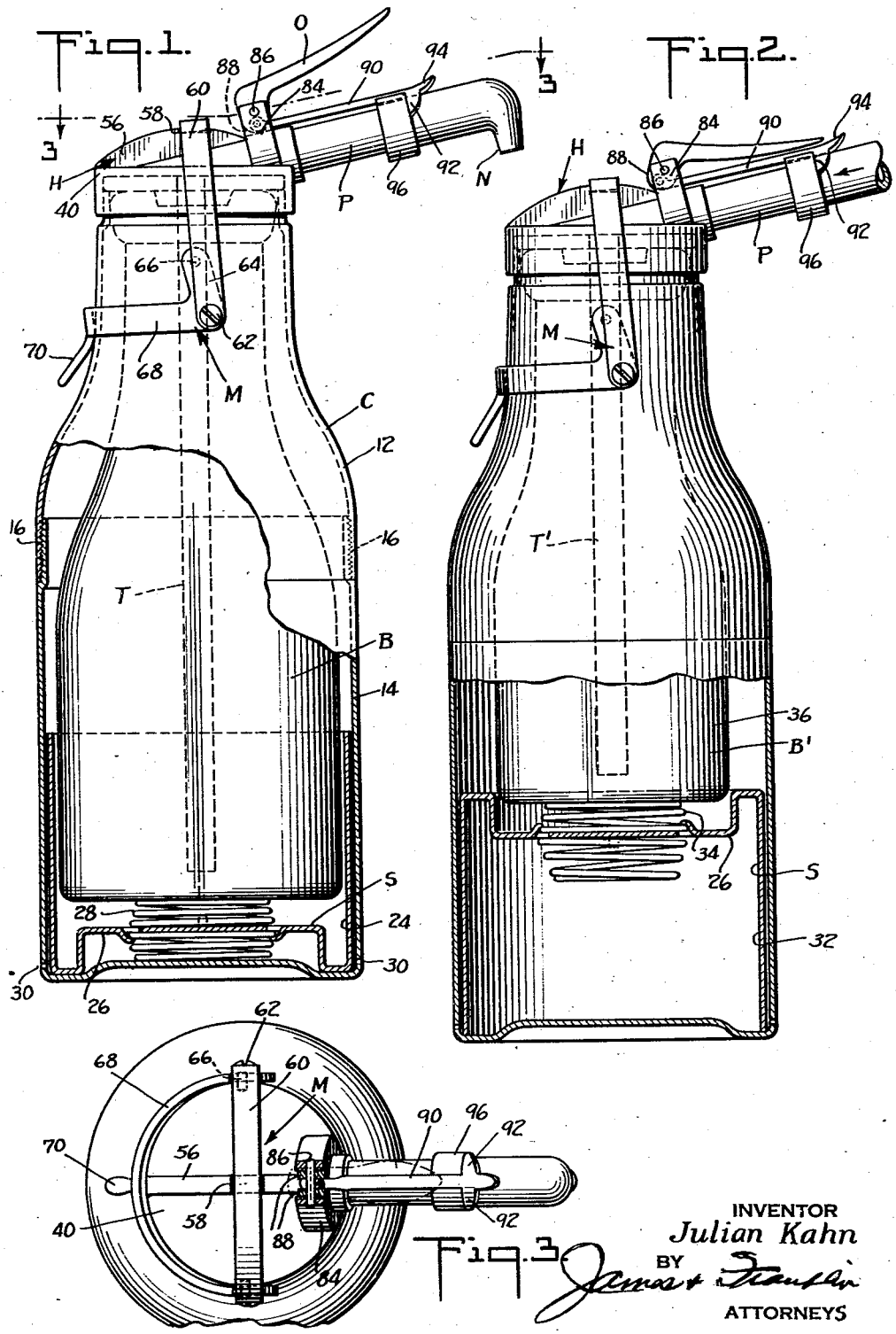

INVENTOR
Julian Kahn
BY
ATTORNEYS

Patented Apr. 23, 1940

2,197,763

UNITED STATES PATENT OFFICE 2,197,763

MIXING APPARATUS FOR CHARGING BEVERAGES OR FOR FROTHING LIQUIDS

Julian Kahn, New York, N. Y.

Application September 24, 1936, Serial No. 102,265

12 Claims. (Cl. 215—4)

This invention relates to apparatus for mixing a liquid with a gas, and more particularly to apparatus for carbonating a beverage, or for whipping cream or for like purposes, by discharging the cream and gas mixture through a constricted orifice.

The primary object of my invention is to generally improve apparatus of the foregoing character. A more particular object is to make such apparatus more sanitary by lining the container of the apparatus with glass. For convenience and economy, I prefer to accomplish this result by using a wide-mouth bottle, most simply a standard milk bottle, the said milk bottle being received within and protectively housed by a metallic container the upper and lower parts of which are separable to facilitate insertion of the milk bottle. In accordance with still another object and feature of my invention, the metallic protective container, while made adequate in dimension to receive a quart-size bottle, is also adapted to receive a pint-size bottle. This is convenient when whipping cream in small amounts. When carbonating a beverage, an advantage incident to the use of a large-mouth bottle is the possibility of placing cracked ice therein, and when whipping cream, ice cream may be added to the cream. The wide-mouth bottle also facilitates thorough cleaning.

In prior devices for whipping cream, the whipped cream is discharged through a nozzle which extends for a substantial distance beyond the control valve, and this has the disadvantage of leaving considerable whipped cream residue in the discharge nozzle where it may sour or spoil. Still another object of my invention is to overcome the foregoing difficulty, which I do by a novel arrangement of discharge pipe and nozzle having a control valve immediately adjacent the end of the nozzle.

In order to simplify the construction of the apparatus, particularly with a view to promoting sanitation by facilitating thorough cleaning of the parts of the apparatus, I employ a single pipe leading into the container. This pipe acts both as a gas inlet pipe and a liquid discharge pipe, and is equipped with a single small valve of inexpensive type, said valve preferably being an ordinary tire air valve. The constriction and complexity of the passage through the tire air valve produce excellent frothing or whipping of the cream, and the entire valve structure is readily bodily removable from the pipe for cleaning or sterilization. In accordance with the general object of promoting sanitation, the passage through the aforesaid pipe is made straight and readily accessible for cleaning. The downwardly bent tip or discharge nozzle is slidable over the pipe and is readily removed therefrom so that it too may be thoroughly cleaned. Moreover, in accordance with the general object of minimizing the contact of the cream with metallic surfaces, the closure for the container as well as the discharge pipe leading therefrom are made of non-metallic material, preferably being integrally molded from a suitable plastic or molding composition, for example "Bakelite".

Another object is to greatly increase the operating eonomy of this class of apparatus by arranging the same for successive filling of gas from a conventional commercial cylinder of gas, in contrast with the use of a miniature bulb which can be used only once and must then be discarded. An ancillary object of my invention resides in the provision of a suitable protective device, preferably a pressure reducing valve for limiting the pressure which may be transferred from the cylinder to the apparatus.

To the accomplishment of the foregoing and other objects which will hereinafter appear, my invention consists in the apparatus elements and their relation one to the other, as are hereinafter more particularly described in the specification and sought to be defined in the claims. The specification is accompanied by drawings in which:

Fig. 1 is a partially sectioned elevation of cream whipping apparatus embodying features of my invention;

Fig. 2 shows the same equipped with a pint rather than a quart dairy bottle;

Fig. 3 is a plan view of the apparatus;

Figure 4:
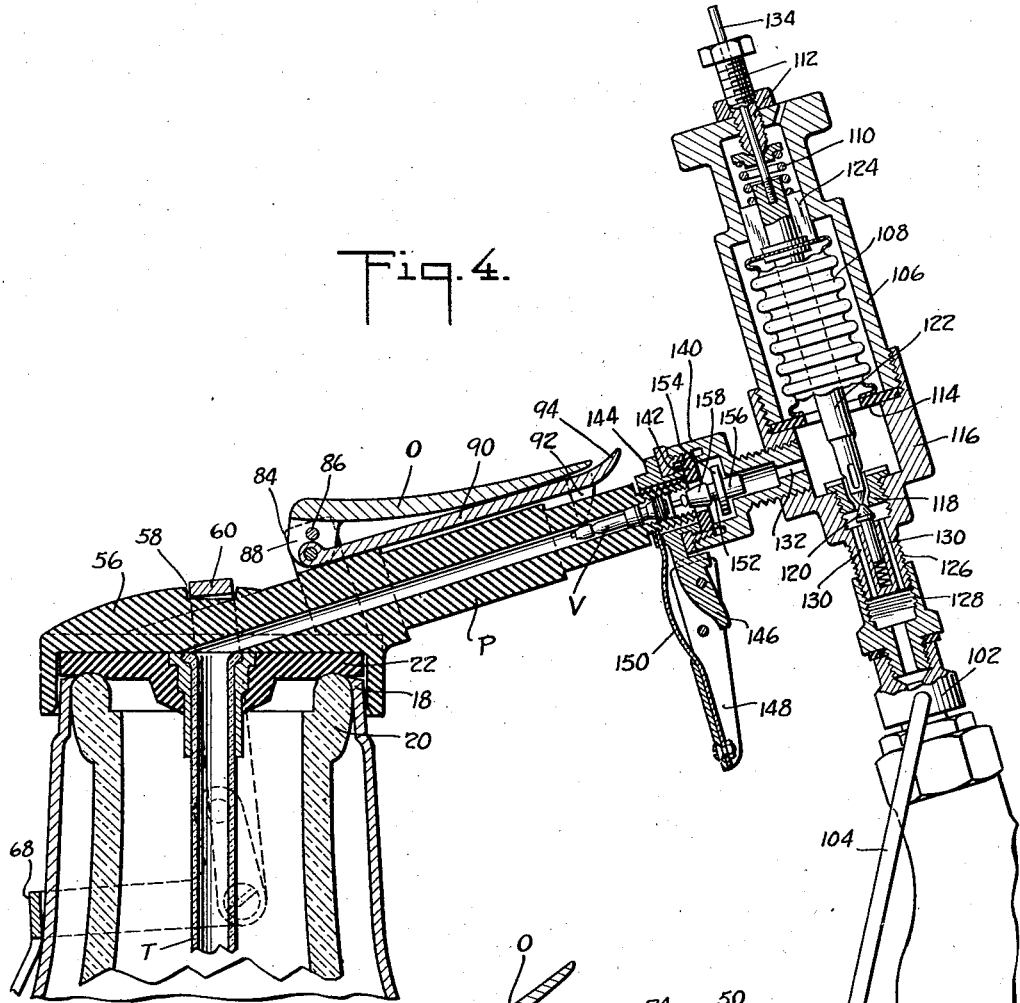
Fig. 4 is a section taken in elevation through the head of the apparatus, with the discharge nozzle removed and the gas supply equipment in place.

Referring to the drawings, the apparatus comprises a protective container C, preferably made of metal. The upper and lower parts of the container may be separated to facilitate the insertion of a glass bottle B therein, the said bottle being a conventional wide-mouthed dairy bottle. The container is closed at the top by a head H which is preferably clamped tightly in position by suitable clamping means M. A siphon tube T is disposed within bottle B and is preferably made of glass. The bottle is supported within container C by a support S which when in the position shown in Fig. 1 accommodates a quart-size bottle, but which may be inverted to the position shown in Fig. 2 in which case it accommodates a pint-size bottle. Head H is provided with a single pipe P which acts both for gas inlet and liquid discharge, the discharge being controlled by a valve V (Fig. 5) operated by a suitable operating handle O. Pipe P is itself straight but is surmounted by a small compact nozzle N preferably located immediately at the valve V.

Considering the arrangement in greater detail, the container C is preferably made of metal. The upper part 12 and the lower part 14 are matingly threaded at 16, so that these parts may be screwed together or taken apart. The container is made adequate in dimension to receive the quart-size milk bottle B. The top edge 18 of the container (Fig. 4) is preferably spun inwardly to limit the upward movement of the rounded mouth 20 of the bottle. It should be noted that the edge 18 is lower than the top of the bottle in order not to interfere with a tight sealing engagement between the bottle and siphon gasket 22. It is not necessary to spin edge 18 inwardly, but I find it convenient to mechanically limit the upward movement of the bottle in order to hold the bottle and the container in proper relation when the head H is removed.

Reverting to Fig. 1, the mouth of the bottle is held upwardly against the top edge of the container by support S which comprises a stiff cup-shaped metallic member 24 the base 26 of which carries a resiliently yieldable member, specifically the spring 28. The spring is not indicated to scale in the drawing, and it will be understood that in practice the spring is a relatively stiff one capable of resisting the pressure of the gas within the bottle, thereby preventing separation of the mouth of the bottle from gasket 22 with consequent escape of the gas. However, if the maximum desired pressure is exceeded, spring 28 yields and permits escape of gas at the mouth of the bottle. The container C is provided with a plurality of minute holes 30 for the free escape of gas from the container.

Referring now to Fig. 2, it will be observed that the support S has been inverted, thus bringing the bottom 26 to an elevated position determined by the height of the side wall or skirt 32. The support is provided with a second resilient member 34, and this bears upwardly against the bottom of pint bottle 36. It is not essential to use the springs 28 and 34, for the support member S may be made rigid and so dimensioned as to tightly squeeze either a quart or pint size bottle into position, the pressure then being determined by the tightness with which the upper and lower halves 12 and 14 of the container are screwed together and by the yieldability of gasket 22. It will also be understood that in apparatus made for beverage rather than cream mixing purposes in which there is no likelihood of ever wanting to employ a pint-size bottle, the support S may be omitted entirely and the container C may itself be dimensioned to directly enclose and to tightly hold in place the quart-size bottle.

Figure 5:
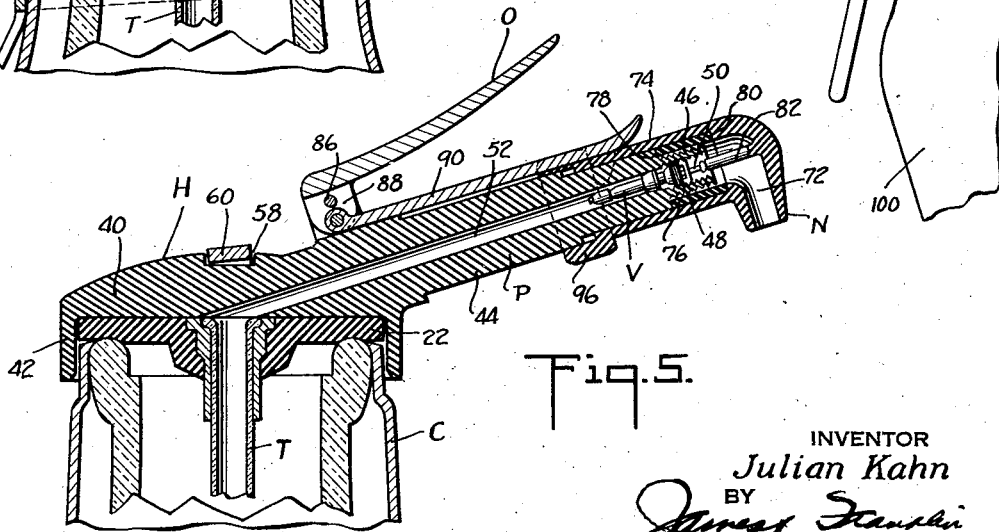
Fig. 5 is a similar section with the discharge nozzle replaced.

Referring now to Fig. 5, the head H comprises a cap or closure 40 having a depending circular flange 42 dimensioned to be received over the upper end of the container. The pipe 44 and cap 40 are preferably formed integrally. The outer end of pipe 44 is reduced in diameter and is internally and externally threaded, as is indicated at 46. The valve V is an ordinary tire air valve such as those sold commercially under the names "Schrader" and "Dill." The valve being conventional, no detailed description thereof is deemed necessary. The cream and gas mixture is passed through successive constrictions, around the end of the valve, through the valve seat along the valve stem and through the valve spring, and finally around the guide bridge of the valve pin. This improves the whipping of the cream.

The threaded end 48 of valve V is screwed into the internal thread of pipe 44. The valve pin 50 is, of course, directed outwardly so that the valve seals pipe 44 against discharge of gas in the bottle. It should be noted that the passage 52 through tube 44 is perfectly straight even though directed substantially sidewardly, and that the passage leads to a point at the center of cap 40 directly over the upper end of siphon tube T. The cap 40 and pipe 44 are preferably formed integrally, as by die-casting the same of metal, or, more preferably, by molding the same out of a suitable plastic or molding composition such as the synthetic resinous materials, for example Bakelite.

The siphon tube T is preferably made of glass and is secured at its upper end to yieldable gasket 22 previously referred to. A metal sleeve 54 may, if desired, be used to lock the glass and rubber parts together. It will be noted that the diameter of gasket 22 substantially exceeds the diameter of the neck of the bottle, although it is, of course, limited to an amount which will be received within flange 42 of cap 40. The gasket is preferably made of full diameter in order to locate siphon tube T concentrically within the bottle, thus assuring communication between the siphon tube and the discharge passage 52. It will be understood that the apparatus is supplied with two such siphon tubes, the tube T, indicated in Fig. 1, being of adequate length for use with a quart-size bottle B, and the tube T', indicated in Fig. 2, being of proper length for use with a pint-size bottle B'.

The head H is locked in place by clamping means M. Referring to Figs. 1 and 3, it will be seen that cap 40 is provided with an arcuate ridge 56. This ridge is recessed at its highest point, 58, to receive a generally U-shaped clamping member 60. The lower ends of member 60 are pivotally secured at 62 to the lower ends of levers 64 the upper ends of which are pivoted on the sides of the container at 66. Levers 64 on opposite sides of the container are formed integrally with and connected by a preferably U-shaped handle 68 having a tab or finger-piece 70. In the drawing the parts are shown in closed or locked condition, and levers 64 are moved slightly beyond dead-center so that the parts remain locked. If, however, finger-piece 70 and with it handle 68 are moved upwardly, the pivots 62 are swung in a clockwise direction about pivots 66 until clamping member 60 is elevated out of recess 58 whereupon it may be swung downwardly or counter-clockwise as viewed in the drawing, thus freeing the head H for removal from the container. The parts of the clamping mechanism are preferably made of metal.

The nozzle N (Fig. 5) comprises a downwardly turned tip 72 and a body or sleeve 74, the latter being dimensioned to slide over the outer end of pipe 44. A gasket 76 is inserted within sleeve 74 and is positioned between a shoulder 78 on pipe 44 and a shoulder 80 within the nozzle. Sleeve 76 is preferably made of yieldable material and functions to normally limit the movement of sleeve 74 over pipe 44. The nozzle is provided with a valve depressor 82 the end of which may approach but does not touch the end of valve pin 50 when the nozzle is in normal position. However, if the nozzle is forced inwardly over pipe 44 against the resistance of sleeve 76, the depressor 82 bears against valve pin 50 and opens the valve, thus permitting discharge of the mixture in the bottle. The nozzle N is preferably molded of non-metallic material such as Bakelite, in which case the valve depressor pin 82 is preferably molded integrally with the nozzle.

The movement of the nozzle, or, more specifically, the opening of the valve is controlled by operating handle O and associated parts next described. Referring to Figs. 1, 2 and 3, the head H has formed integrally therewith a pair of upstanding bearings 84 through which passes the fulcrum pin 86 on which operating handle O is mounted. Handle O is an angle lever the depending arm 88 of which moves between bearings 84 and has connected thereto a link 90 (Fig. 5) overlying discharge pipe P. To connect link 90 to arm 88, the latter is bifurcated as is best shown in Fig. 3, and the end of link 90 is narrowed to be received therebetween. The opposite or free end of link 90 is provided with sidewardly directly and preferably downwardly curved arms 92, as well as a longitudinally directed tab 94. The inner end of nozzle N is enlarged to form a collar 96, and the top of collar 96 is recessed to receive link 90, thus permitting the transverse arms 92 to fall into position outside of collar 96. With this arrangement it will be evident that upon downward movement of handle O the link 90 is drawn inwardly against collar 96, thereby moving the collar and with it the nozzle against the resistance of the yieldable sleeve 76 previously referred to. This movement causes the valve depressor to slightly open the valve, resulting in a discharge of whipped cream from the nozzle.

To charge the apparatus, a suitable quantity of cream is poured into the bottle within the container. The amount of cream is, of course, substantially less than the capacity of the bottle in order to leave room for compression of the gas to be mixed therewith. The head H is then placed over the container and is clamped tightly in place by the clamping means M previously described. The nozzle N is readily removed by lifting upwardly of tab 94, thus elevating link 90 until it is clear of the collar 96. At this time the nozzle is simply slid off pipe P. With nozzle N removed, the externally threaded end of pipe P is exposed, and a suitable source of gas under pressure is connected to the threaded end of the pipe.

Referring to Fig. 4, the gas is preferably supplied from a conventional commercially available cylinder 100. This cylinder is provided with a valve having an operating collar 102 turned by a handle 104. These elements form a part of the gas cylinder as commercially marketed. The gas employed when whipping cream may, for example, be nitrous oxide or carbon dioxide. The latter gas may also be used for carbonating beverages. The cylinder 100 may be of a small conveniently-handled size, say six ounces, although somewhat larger cylinders, say ten or sixteen ounces, may also be used, and even a relatively tiny three-ounce cylinder is far more economical to use than the individual bulbs of gas heretofore supplied for use with cream whipping devices.

In order to protect the apparatus against excessive pressure from cylinder 100, a suitable protective device is employed between the cylinder and pipe P. This protective device preferably takes the form of a reducing valve. Thus, referring to Fig. 4, the reducing valve mechanism is housed within a body 106 and comprises a movable or expansible diaphragm 108 normally urged downwardly by a loading spring 110 the compression of which may be adjusted by a screw 112 threaded into the end of casing 106. In the particular case here illustrated the diaphragm 108 takes the form of a corrugated or flexible metal bellows. The lower or open end of the bellows is secured to a disc 114 which in turn is clamped between the parts 106 and 116 of the case.

The lower end of the case is fitted with a valve seat 118 with which cooperates a movable valve 120. Valve 120 is formed at the lower end of a rod 122 which extends upwardly through bellows 108 and is secured to the upper or movable end thereof as well as to the guide member 124 slidable in the upper part of casing 106. The lower end of casing 116 is threaded at 126 to mate with the internally threaded outlet 128 of cylinder 100. Holes 130, passing through the threaded end 126, permit the gas flowing from cylinder 100 to pass upwardly through valve 118 and into bellows 108. The gas flows through a suitable discharge passage 132 which in turn leads to valve V and pipe P. If the pressure beneath diaphragm or bellows 108 becomes excessive and exceeds the loading of spring 110, the bellows expands, thereby moving rod 122 upwardly and closing valve 120, thus preventing further flow of gas from the cylinder. An indicator rod 134 is preferably secured to the movable diaphragm, and screw 112 is drilled to pass rod 134. Upward movement of the rod may be used as an indication that the valve has closed, thus showing that the charge of gas has been completed. At this time valve 104 on cylinder 100 may be closed and the cylinder and reducing valve removed from pipe P. The nozzle N is replaced on pipe P, the link 90 being pushed downwardly over the collar 96 of the nozzle. The apparatus may, if desired, be shaken to insure mixture of the gas and cream, and is thereupon ready for use.

The reducing valve and the threaded end of pipe P may be connected by a flexible hose with a screw coupling or thumb nut, the latter being screwed directly over the external thread on pipe P. However, in Fig. 4 I show a particularly convenient self-sealing means for rapidly connecting or disconnecting the reducing valve to pipe P. This means comprises a chamber 140 within which is secured a rubber washer 142. A collar 144 at the outer end of chamber 140 carries a bearing lug 146 on which a handle 148 is pivoted. Handle 148 carries a spring 150 which is slidable toward and away from the center of collar 144, it normally moving inwardly and being retractable by means of handle 148. To connect the device to pipe P, it is merely necessary to draw handle 148 toward the gas cylinder and reducing valve, and to then slip collar 144 over the end of pipe P, whereupon handle 148 is released.

Chamber 140 is preferably fitted with a small stopper 152 formed with a disc 154, a piston 156 at one end, and a pusher 158 at the opposite end. Before the device is applied to pipe P the pressure of gas attempting to leave through outlet 132 forces the stopper 152 outwardly until disc 154 is pressed tightly against the sealing washer 142. This prevents escape of gas even though the cylinder valve 102 is open. When the collar 144 is pressed over the threaded end of pipe P, the pusher 158 bears against either the valve pin or the end of pipe P, thus forcing disc 154 away from washer 142 and permitting gas to flow around stopper 152 through valve V and into the mixer. It may be mentioned that piston 156 is small enough in diameter to provide clearance for gas flow therearound, and that pusher 158 is preferably flattened on opposite sides in order to insure adequate gas flow space. When the charging operation has been completed, it is merely necessary to again pull handle 148 and to thereupon remove the gas cylinder and pressure reducing valve combination from the end of pipe P. Valve V closes instantly because of its own spring and because of the gas pressure thereagainst. At the same time, stopper 152 moves outwardly and prevents escape of gas from the gas cylinder. The main valve 102 may then be closed by means of handle 104.

Nozzle N is thereupon slipped over the end of pipe P, and link 90 is dropped into position over collar 96. The apparatus is then ready for use.

It is believed that the construction and operation as well as the many advantages of my improved apparatus will be apparent from the foregoing detailed description thereof. The mixture is kept in a glass container, and the latter is protectively housed within a metal container. The glass container is itself inexpensive, being a conventional dairy bottle. A single metal container is arranged to receive either a pint or a quart bottle. Both of these bottles have wide mouths which facilitate pouring contents therein and which even make it possible to employ cracked ice when charging a beverage. The pint-size bottle is convenient when whipping cream. The discharge nozzle and control valve arrangement is such that the valve is very close to the tip of the nozzle, thus minimizing the quantity of whipped cream exposed to air outside the valve. The nozzle, in addition to being small, is downwardly directed, and even the small quantity of whipped cream therein tends to flow out. A single pipe is used both as a gas inlet pipe and a cream discharge pipe, and a single valve is used as a gas inlet valve, a cream discharge valve, and a cream whipping passage. This valve is a conventional inexpensive tire air valve. It is readily removed for cleaning and may be replaced at negligible expense if worn or defective. When the valve is removed, the passage through the discharge pipe is a straight passage which is readily cleaned. There is very little contact between cream and metal, for the container and the siphon tube are made of glass, while the discharge pipe and nozzle may be molded of a suitable non-metallic molding material. The valve is made of metal but it is extremely small in dimension and, as before stated, is completely removed when cleaning the apparatus. The apparatus is economical to use because it is repeatedly charged with gas from a conventional commercially available cylinder, in contrast with the use of expensive individual bulbs of gas which are used for only a single charge and then discarded. The introduction of excessive gas pressure is prevented by the use of a reducing valve, and as an additional precaution provision may be made for leakage at the mouth of the bottle should the gas pressure become excessive. If gas escapes into the metal container the latter is protected by the provision of suitable vent holes. While the container is openable for the insertion or the removal of the bottle, the bottle need not be removed each time the apparatus is to be charged and instead it is merely necessary to open the cap by means of a rapid action clamp. The same charging pressure is attained whether the quart or pint size bottle is used.

It will be apparent that while I have shown and described my invention in a preferred form, many changes and modifications may be made in the structure disclosed, without departing from the spirit of the invention, defined in the following claims.

I claim:

1. Apparatus for whipping cream or for like purposes, said apparatus comprising a protective container the upper and lower portions of which are separable to receive a standard glass dairy bottle, a gas inlet and cream discharge pipe at the top of said container, said pipe having means to facilitate the connection of a cylinder of gas thereto, a single valve in said pipe adapted to act as a gas inlet valve, a cream discharge valve, and a cream whipping passage, and manually controllable means for opening the valve for cream discharge.

2. Apparatus for whipping cream or for like purposes, said apparatus comprising a metal protective container the upper and lower portions of which are separable by means of a threaded connection to receive a wide-mouth glass bottle, a glass siphon tube disposed within said bottle, a sidewardly directed gas inlet and cream discharge pipe at the top of said container leading directly from the upper end of the siphon tube, said pipe having a threaded end for a gas inlet connection, a single valve in said pipe adapted to act as a gas inlet valve, a cream discharge valve, and a cream whipping passage, a downwardly directed cream discharge nozzle removably applied to said pipe, said nozzle covering and concealing the threaded end of said pipe during cream discharge, and manually controllable means for opening the valve for cream discharge.

3. Apparatus for whipping cream or for like purposes, said apparatus comprising a metal protective container openable to receive therein a standard glass dairy bottle, means at the bottom of said container to hold the bottle upwardly against the upper end of the container, said means being so designed as to support either a pint or a quart dairy bottle.

4. Apparatus for mixing a gas and a liquid, said apparatus comprising a metal protective container openable to receive therein a standard glass dairy bottle, means at the bottom of said container to hold the bottle upwardly against the upper end of the container, said means being cup-shaped and so dimensioned that when positioned with the open end upwardly it supports a quart bottle in position, and when positioned with the closed end upwardly it supports a pint bottle in position.

5. Apparatus for mixing a gas and a liquid, comprising an openable metal protective but not gas-tight container adapted to receive a wide-mouthed dairy bottle therein, a resilient gasket at the top of the container, means bearing against the bottom of the bottle for holding the mouth of the bottle against said gasket at the top of the container, said means including a resiliently yieldable member so proportioned as to prevent separation and leakage at the mouth when the gas pressure within the bottle is less than the desired maximum, but to yield and permit escape of gas when the pressure exceeds the desired maximum, the gas escaping from said bottle and container to the free atmosphere.

6. Apparatus for whipping cream or for like purposes, comprising an openable metal protective container adapted to receive either a pint or a quart milk bottle therein, a resilient gasket at the top of the container, means bearing against the bottom of the bottle for holding the mouth of either the pint or the quart bottle against said gasket at the top of the container, said means including a resiliently yieldable member so proportioned as to prevent separation and leakage at the mouth when the gas pressure within the bottle is less than the desired maximum, but to yield and permit escape of gas when the pressure exceeds the desired maximum, said metal container having one or more apertures therein to facilitate escape of gas to the free atmosphere in the event of discharge of gas from the bottle into the metal container.

7. Apparatus for mixing a gas and liquid, said apparatus comprising a protective container the upper and lower body parts of which are separable to receive a standard glass milk bottle, the upper end of the upper body part being open to expose the top of the milk bottle, a cap removably applicable to the top of the upper body part of said container for closing both the bottle and the container, said cap being formed integrally with a discharge pipe, a gasket within said cap for bearing downwardly directly on the top of the milk bottle, and a quick release clamp means on said container to clamp said cap and gasket downwardly in position against the top of the milk bottle.

8. Apparatus for mixing a gas and a liquid, said apparatus comprising a container for the mixture, a cap removably applicable to the upper end of said container, a siphon tube having its upper end connected to a gasket adapted to fit between the container and the cap, a clamp for clamping said cap against the upper end of the container with the gasket therebetween, a discharge pipe leading from said cap at the upper end of the siphon tube, the outer end of said pipe being internally and externally threaded, a valve of the air tire type screwed into said pipe with the operating pin thereof directed outwardly, a discharge nozzle removably and reciprocably applied over the pipe, an operating handle secured to said cap and having a part releasably connected to said nozzle for reciprocating the nozzle longitudinally of the pipe, and a valve pin depressor in said nozzle so dimensioned that upon operation of the handle the resulting movement of the nozzle causes the valve pin depressor to slightly open the valve.

9. Apparatus for whipping cream or for like purposes, said apparatus comprising a container for a gas and cream mixture, a cap removably applicable to the upper end of said container, a glass siphon tube having its upper end connected to a rubber gasket adapted to fit between the container and the cap, a clamp for clamping said cap against the upper end of the container with the gasket therebetween, a cream discharge pipe leading sidewardly from said cap at the upper end of the siphon tube, the outer end of said pipe being internally and externally threaded, a valve of the air tire type screwed into said pipe with the operating pin thereof directed outwardly, a short compact downwardly directed cream discharge nozzle removably and reciprocably applied over the pipe, an operating handle secured to said cap and having a part releasably connected to said nozzle for reciprocating the nozzle longitudinally of the pipe, and a valve pin depressor in said nozzle so dimensioned that upon operation of the handle the resulting movement of the nozzle causes the valve pin depressor to slightly open the valve.

10. Apparatus for mixing a gas and a liquid, said apparatus comprising a protective metal container openable to receive a standard glass milk bottle, a cap removably applicable to the upper end of said container, a siphon tube having its upper end connected to a gasket adapted to fit between the cap and the neck of the bottle, a clamp for clamping said cap against the upper end of the container with the gasket in place, a discharge pipe leading from said cap at the upper end of the siphon tube, the outer end of said pipe being internally and externally threaded, a valve of the air tire type screwed into said pipe with the operating pin thereof directed outwardly, a discharge nozzle removably and reciprocably applied over the pipe, an operating handle secured to said cap and having a part releasably connected to said nozzle for reciprocating the nozzle longitudinally of the pipe, and a valve pin depressor in said nozzle so dimensioned that upon operation of the handle the resulting movement of the nozzle causes the valve pin depressor to slightly open the valve.

11. Apparatus for mixing a gas and a liquid, said apparatus comprising a container for the mixture, a cap removably applicable to the upper end of said container, a siphon tube having its upper end extending through a gasket which is adapted to fit between the container and the cap, means for clamping said cap against the upper end of the container with the gasket therebetween, a discharge pipe leading from said cap at the upper end of the siphon tube, a valve of the air tire type secured into said pipe with the operating pin thereof directed outwardly, a discharge nozzle removably and reciprocably applied over the pipe, an operating handle secured to said cap and having a part releasably connected to said nozzle for reciprocating the nozzle longitudinally of the pipe, and a valve pin depressor in said nozzle so dimensioned that upon operation of the handle the resulting movement of the nozzle causes the valve pin depressor to slightly open the valve.

12. Apparatus for whipping cream or for like purposes, said apparatus comprising a container for a gas and cream mixture, a cap removably applicable to the upper end of said container, a siphon tube having its upper end extending through a gasket which is adapted to fit between the container and the cap, means for clamping said cap against the upper end of the container with the gasket therebetween, a cream discharge pipe leading sidewardly from said cap at the upper end of the siphon tube, a valve of the air tire type secured into said pipe with the operating pin thereof directed outwardly, a short compact downwardly directed cream discharge nozzle removably and reciprocably applied over the pipe, an operating handle secured to said cap and having a part releasably connected to said nozzle for reciprocating the nozzle longitudinally of the pipe, and a valve pin depressor in said nozzle so dimensioned that upon operation of the handle the resulting movement of the nozzle causes the valve pin depressor to slightly open the valve.

JULIAN KAHN.